(12) United States Patent
Kannoo et al.

(10) Patent No.: US 12,398,824 B2
(45) Date of Patent: Aug. 26, 2025

(54) VALVE GEAR

(71) Applicant: FUJIKOKI CORPORATION, Tokyo (JP)

(72) Inventors: Takeshi Kannoo, Tokyo (JP); Takao Harada, Tokyo (JP); Masashi Yamashita, Tokyo (JP); Junya Hayakawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 117 days.

(21) Appl. No.: 18/547,943

(22) PCT Filed: May 18, 2022

(86) PCT No.: PCT/JP2022/020603
§ 371 (c)(1),
(2) Date: Mar. 1, 2024

(87) PCT Pub. No.: WO2022/249936
PCT Pub. Date: Dec. 1, 2022

(65) Prior Publication Data
US 2024/0309967 A1    Sep. 19, 2024

(30) Foreign Application Priority Data
May 24, 2021  (JP) ................................. 2021-086715

(51) Int. Cl.
*F16K 31/53*  (2006.01)
*F16K 5/06*  (2006.01)
(52) U.S. Cl.
CPC .......... *F16K 31/535* (2013.01); *F16K 5/0605* (2013.01)

(58) Field of Classification Search
CPC ...... F16K 5/0605; F16K 5/061; F16K 5/0647; F16K 31/041; F16K 31/047; F16K 31/535
See application file for complete search history.

(56) References Cited

U.S. PATENT DOCUMENTS 11,333,283 B2 * 5/2022 Holden ................. F16L 29/002
2015/0226341 A1   8/2015 Broome
(Continued)

FOREIGN PATENT DOCUMENTS

CN    108426056 A    8/2018
CN    211550603 U    9/2020
(Continued)

OTHER PUBLICATIONS

Machine English translation of FR-1362597-A (Year: 2025).*
(Continued)

*Primary Examiner* — Hailey K. Do
(74) *Attorney, Agent, or Firm* — LUCAS & MERCANTI, LLP (57) ABSTRACT

A valve gear includes a valve main body having a valve chamber in an inner portion, a valve body having a flow channel space in an inner portion and changing a flow rate for fluid by being rotated and driven within the valve chamber, a first flow channel hole formed in the valve main body and communicated with the flow channel space to allow the fluid to pass through, a second flow channel hole formed in the valve main body changing a communicated state with the flow channel space by a rotational displacement position of the valve body and allowing the fluid to pass through when being communicated with the flow channel space, and a transmission mechanism including a valve body drive shaft transmitting a drive force for rotating
(Continued)

the valve body to the valve body. Rotation axes of the valve body and the valve body drive shaft are orthogonal.

9 Claims, 9 Drawing Sheets

(56) References Cited

U.S. PATENT DOCUMENTS

2018/0135763 A1   5/2018  Liu
2018/0313462 A1*  11/2018 Yoshida ................. F16K 5/202

FOREIGN PATENT DOCUMENTS

| CN | 211550604 U |   | 9/2020 | |
|---|---|---|---|---|
| FR | 1362597 A | * | 6/1964 | |
| GB | 1211035 A | * | 11/1970 | ........... F16K 31/535 |
| JP | S60-110775 U |   | 7/1985 | |
| JP | H06-147339 A |   | 5/1994 | |
| JP | 2005291347 A |   | 10/2005 | |
| JP | 2011-169613 A |   | 9/2011 | |

OTHER PUBLICATIONS

Office Action dated Dec. 13, 2023 for corresponding Japanese Patent Application No. 2023-523427, with English translation.
Office Action issued on Apr. 23, 2025 for the corresponding Japanese Patent Application No. 2024-062259, 10 pages, with English translation.
International Search Report issued for PCT Application No. PCT/JP2022/020603, dated Jul. 26, 2022.

\* cited by examiner

VALVE GEAR

CROSS REFERENCE TO RELATED APPLICATION

This Application is a 371 of PCT/JP2022/020603 filed on May 18, 2022 which, in turn, claimed the priority of Japanese Patent Application No. 2021-086715 filed on May 24, 2021, both applications are incorporated herein by reference.

TECHNICAL FIELD

The present invention relates to a valve gear, and more particularly to a ball valve which is provided in a refrigeration cycle device such as an air conditioner for regulating a flow rate of a refrigerant.

BACKGROUND ART

Figure 1:
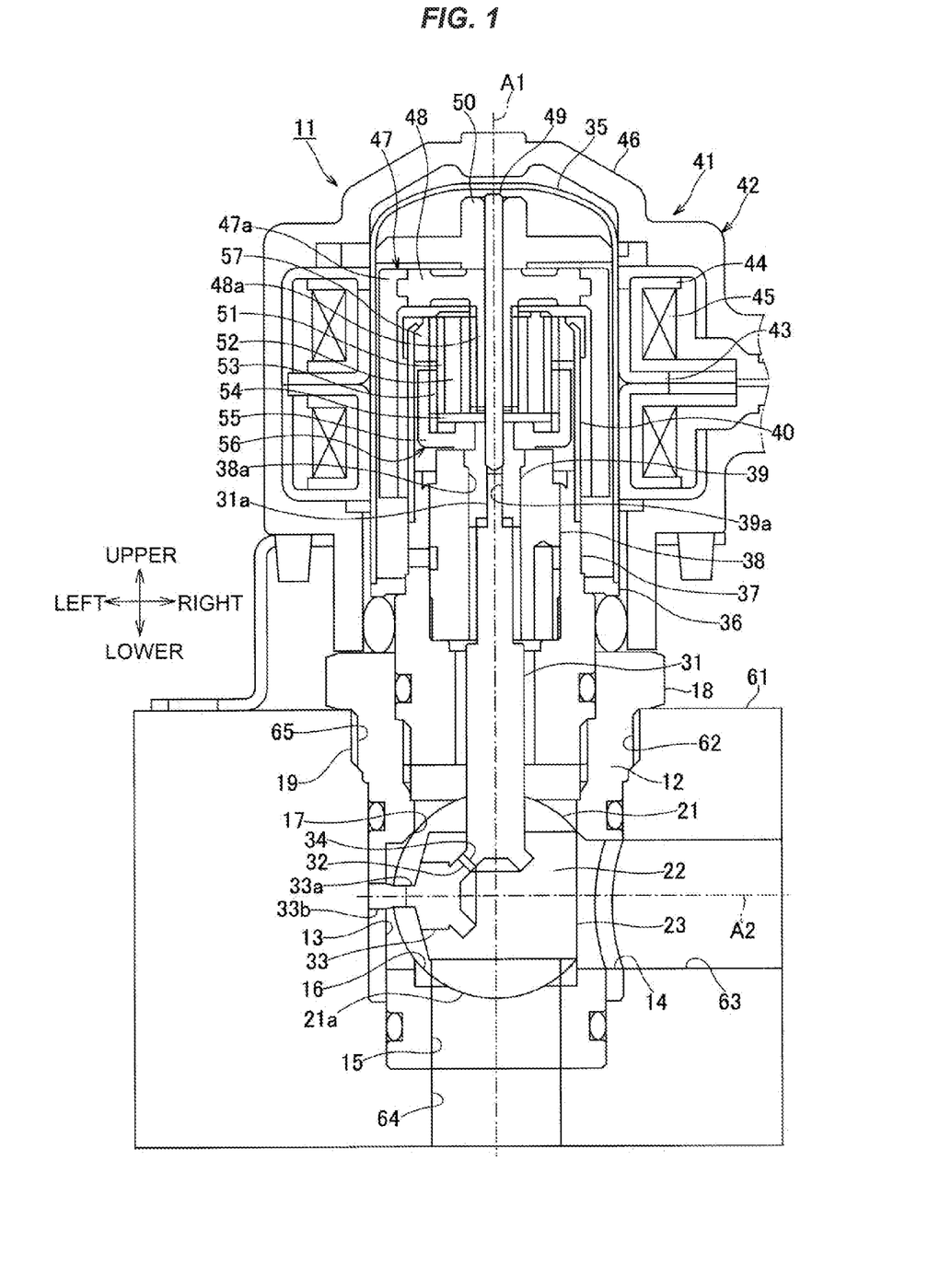
FIG. 1 is a vertical cross sectional view showing a whole structure of a valve gear (a valve close state) according to an embodiment of the present invention.
Figure 2:
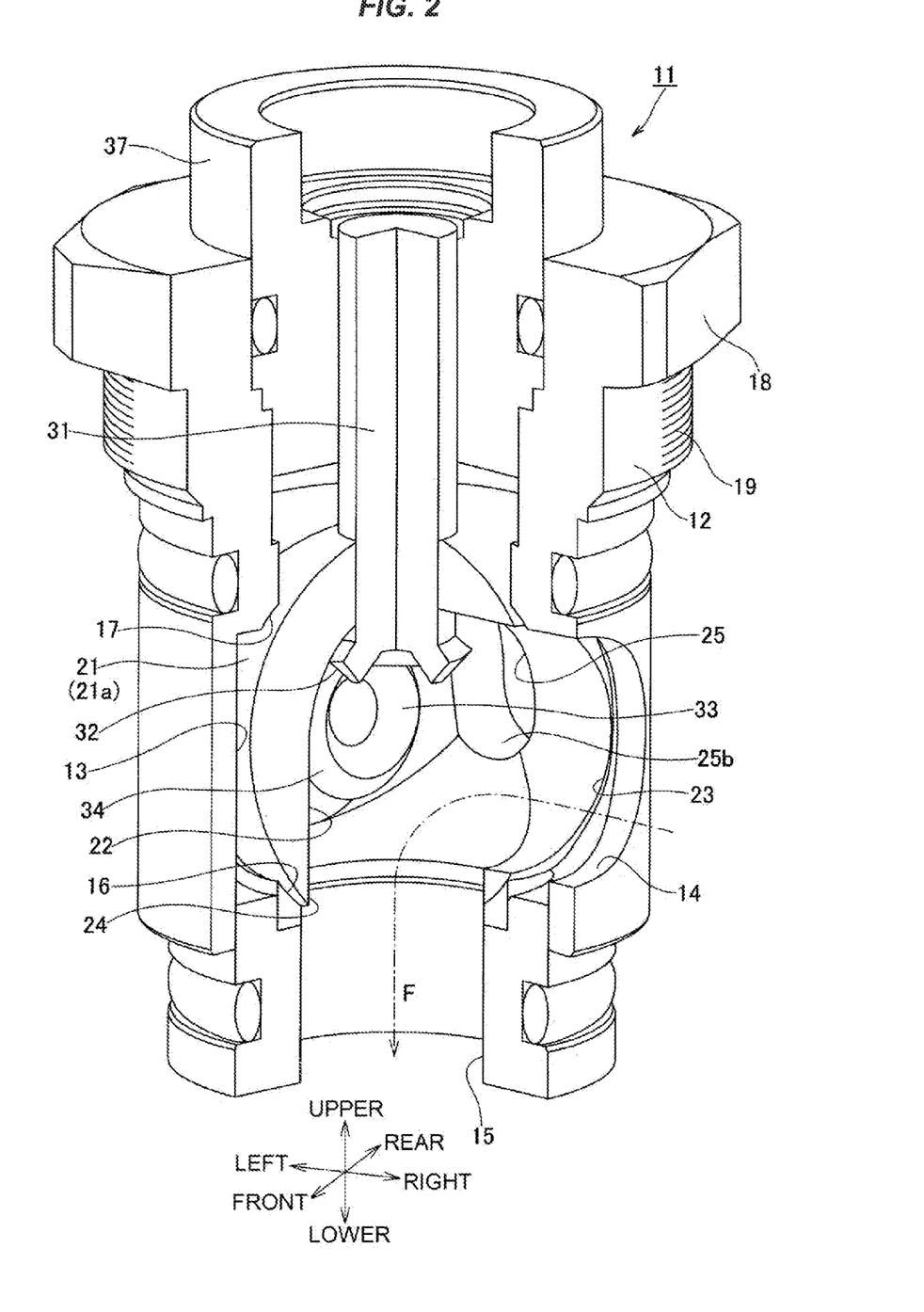
FIG. 2 is a partly notched perspective view showing an internal structure of the valve gear (a main part except a drive unit, a second bearing member, an upper portion of a first bearing member and an upper portion of a valve body drive shaft) according to the embodiment.
Figure 3:
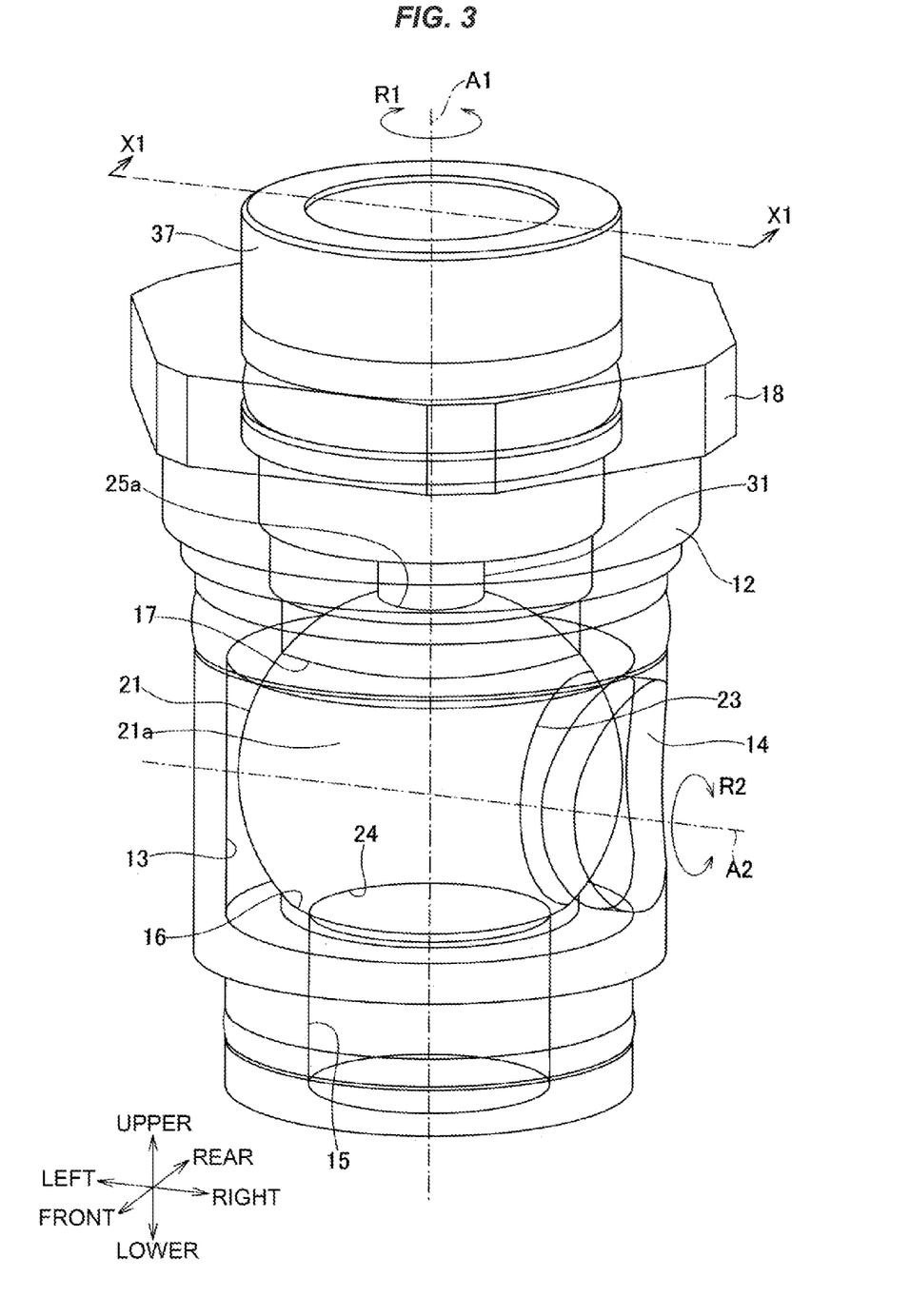
FIG. 3 is a perspective view showing a motion (a valve open state) of a valve body in the valve gear according to the embodiment in a perspective state.
Figure 4:
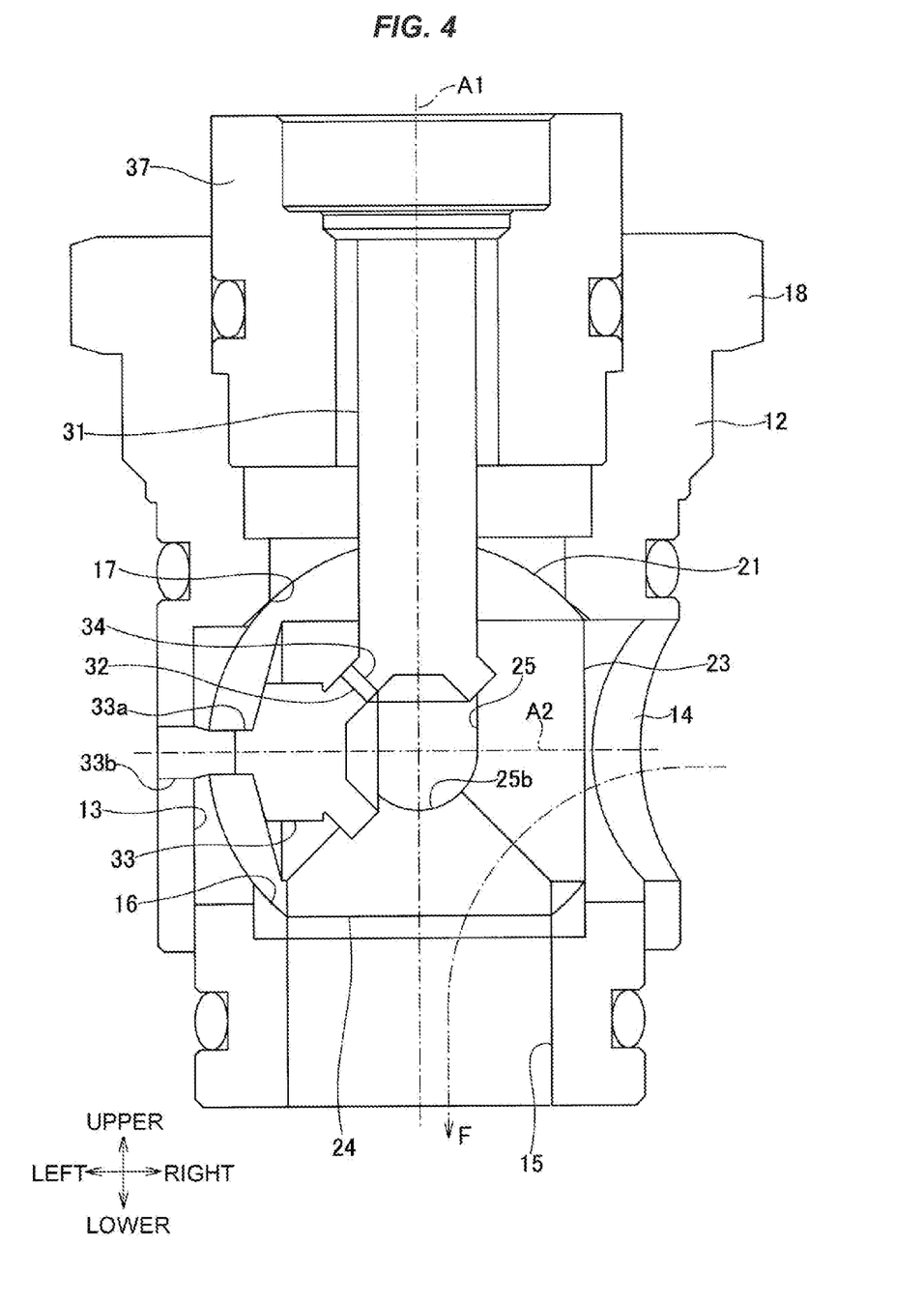
FIG. 4 is a vertical cross sectional view showing a motion (a valve open state/cross section along a line X1-X1 in FIG. 3) of the valve body in the valve gear according to the embodiment.
Figure 5:
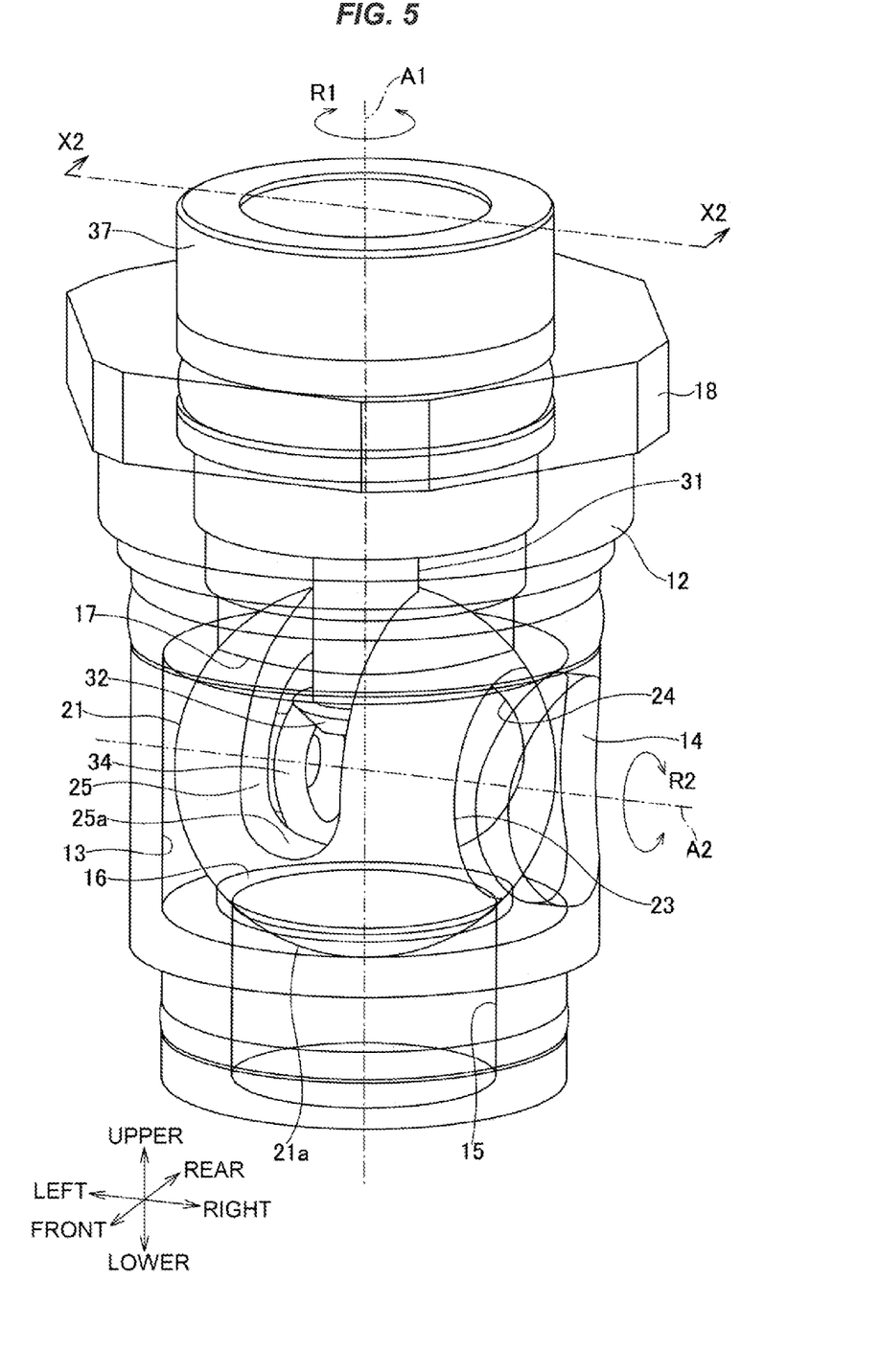
FIG. 5 is a perspective view showing a motion (a valve close state) of the valve body in the valve gear according to the embodiment in a perspective state.
Figure 6:
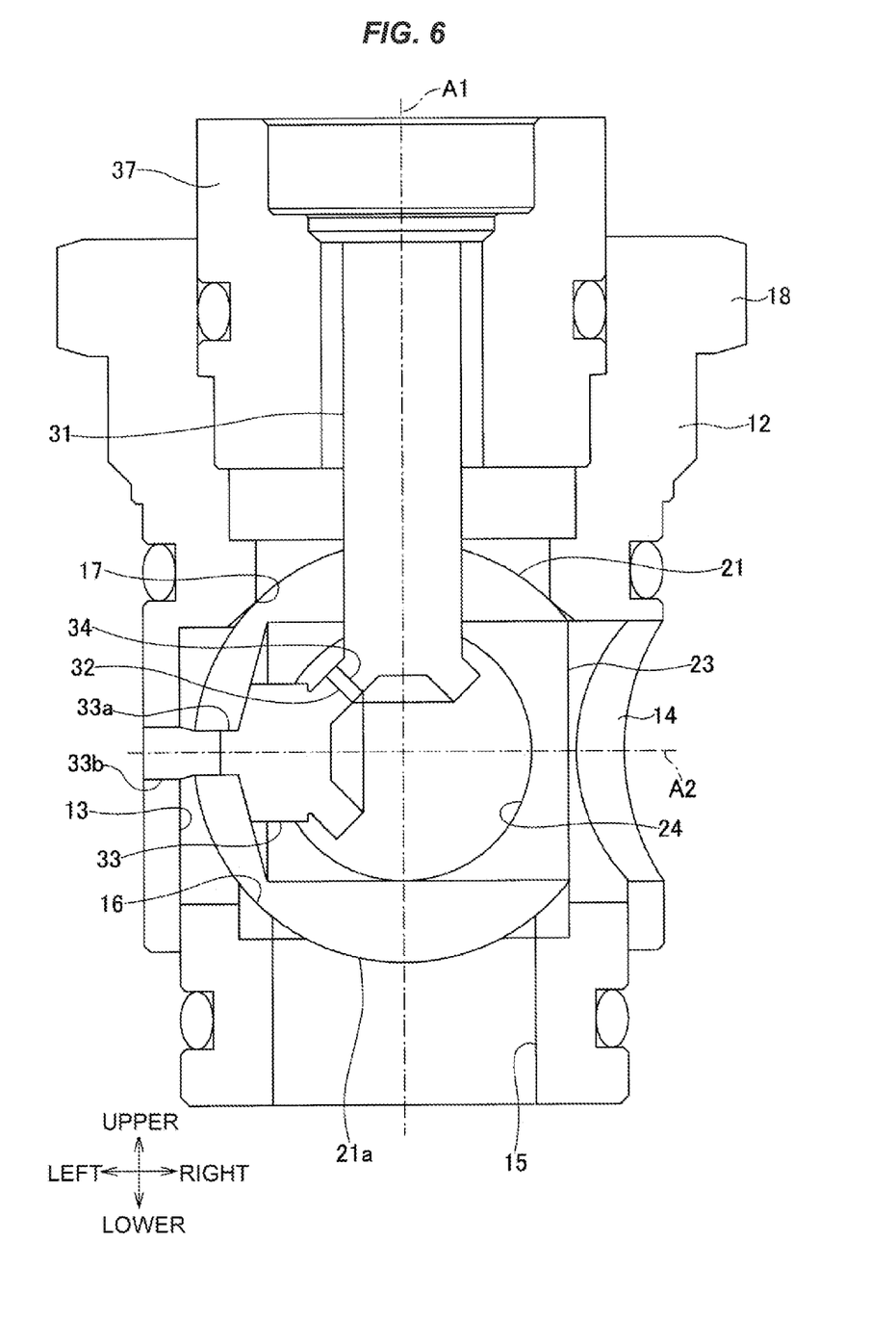
FIG. 6 is a vertical cross sectional view showing a motion (a valve close state/cross section along a line X2-X2 in FIG. 5) of the valve body in the valve gear according to the embodiment.
Figure 7:
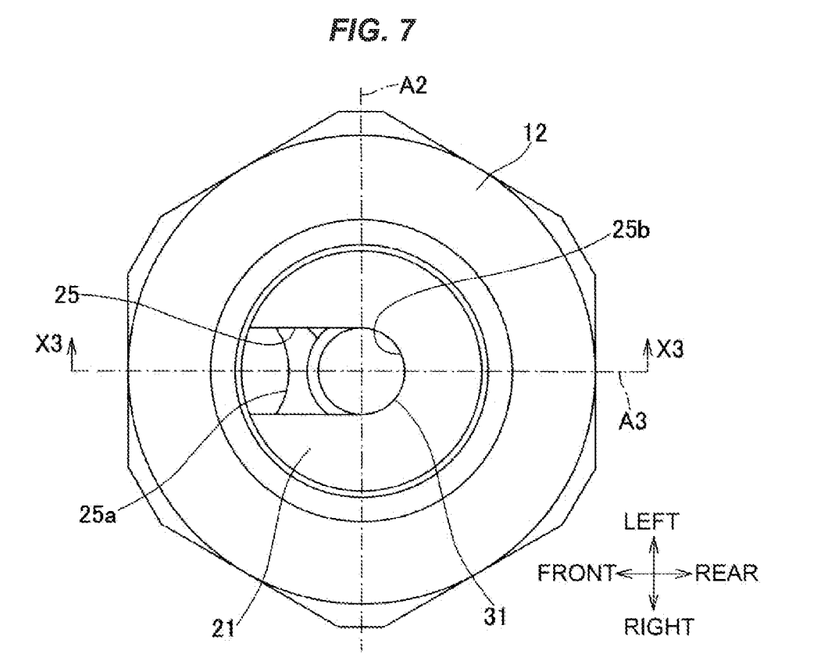
FIG. 7 is a plan view showing a main part (a valve close state) of the valve gear according to the embodiment.
Figure 8:
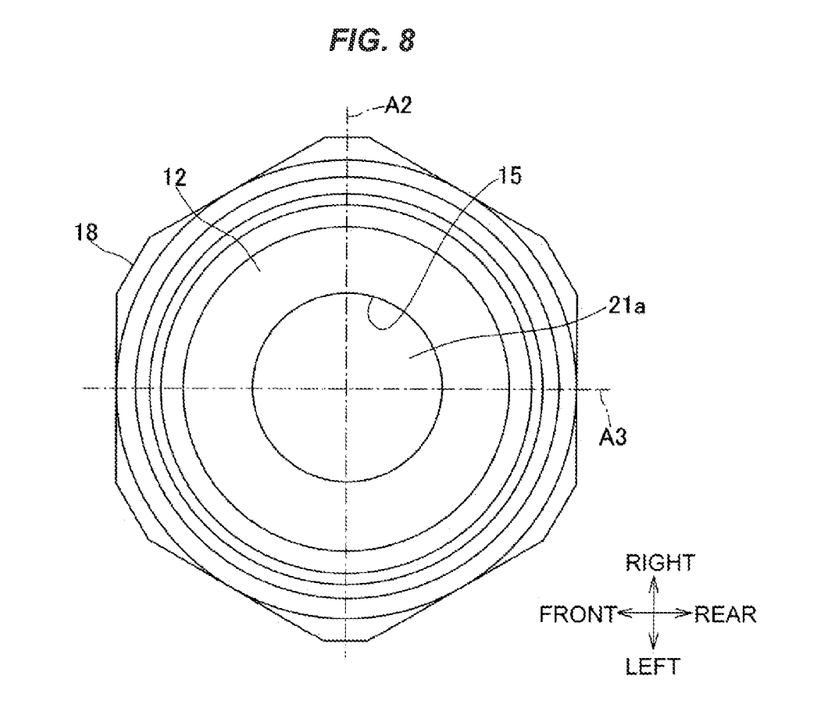
FIG. 8 is a bottom elevational view showing a main part (a valve close state) of the valve gear according to the embodiment.
Figure 9:
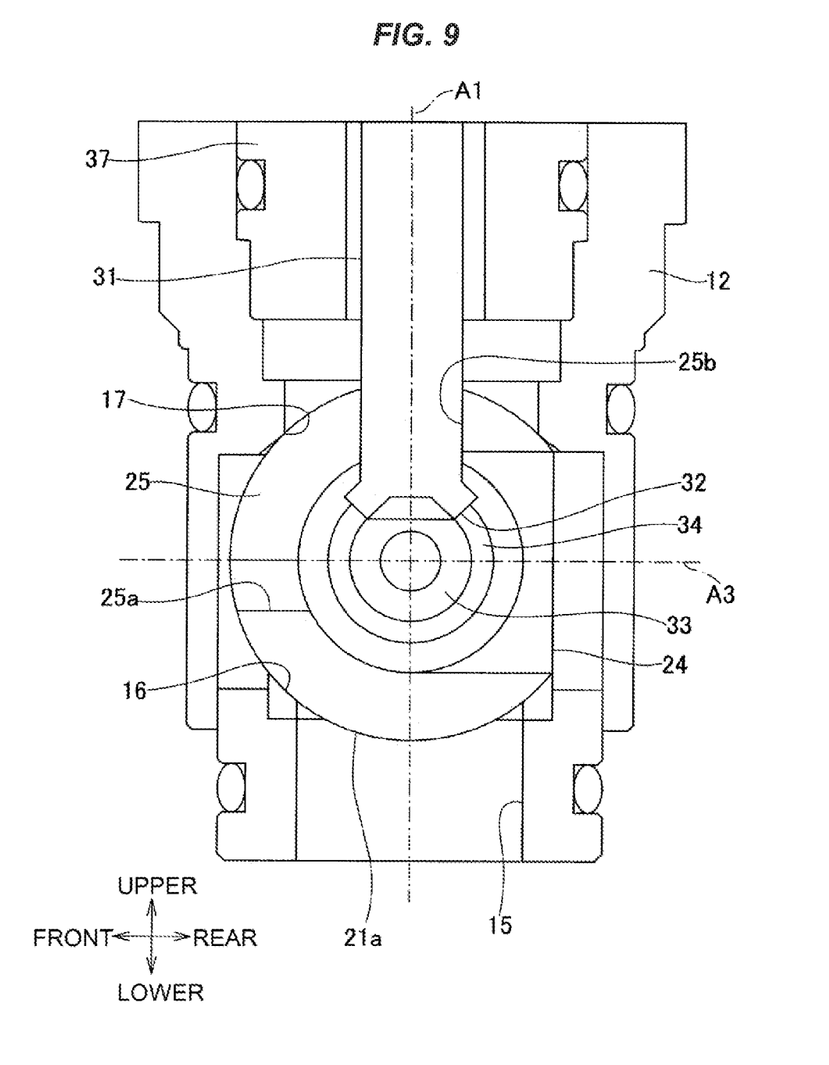
FIG. 9 is a vertical cross sectional view showing a main part (a valve close state/cross section along a line X3-X3 in FIG. 7) of the valve gear according to the embodiment.
Figure 10:
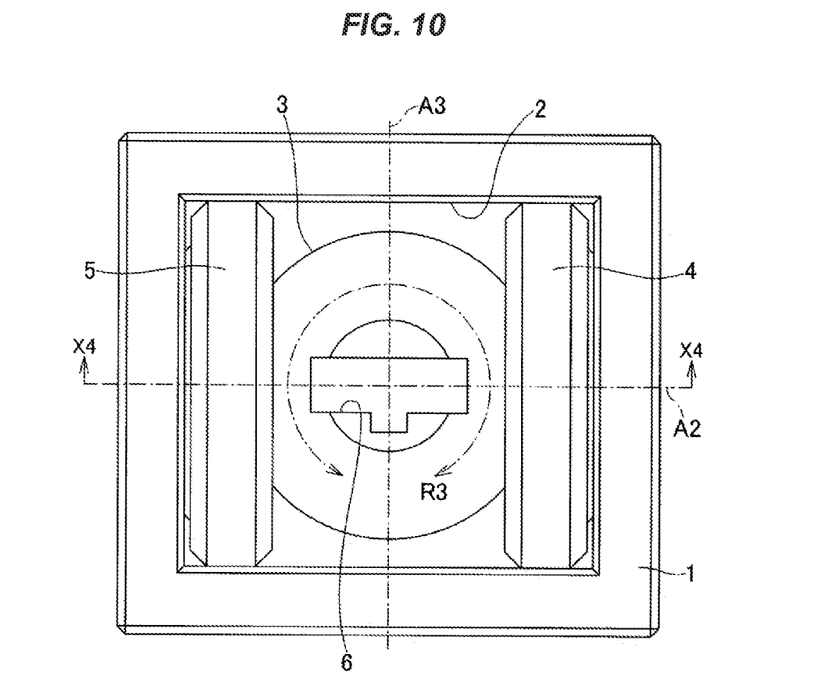
FIG. 10 is a plan view showing an internal structure of a conventional valve gear (a ball valve).
Figure 11:
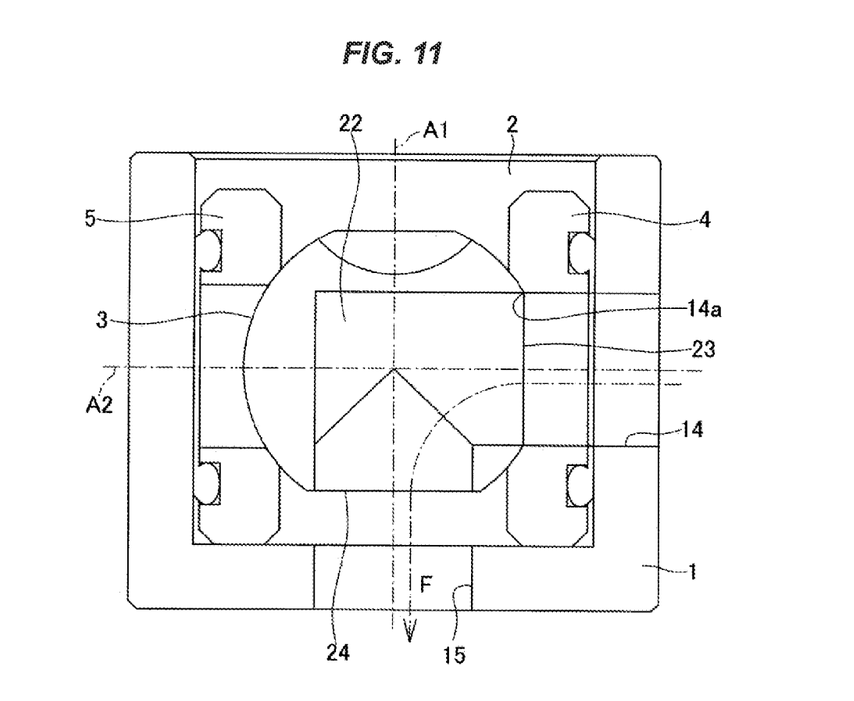
FIG. 11 is a vertical cross sectional view showing the internal structure (a cross section along a line X4-X4 in FIG. 10) of the conventional valve gear (the ball valve).

In the refrigeration cycle device such as a car air-conditioner, a needle valve and a ball valve are provided for regulating a flow rate of a refrigerant. FIGS. 10 and 11 show an example of the ball valve as mentioned above. As shown in these drawings, in the conventional ball valve, a spherical valve body 3 is arranged in an inner portion (a valve chamber 2) of a valve main body 1, and the flow rate of the refrigerant is changed by rotating the valve body 3.

More specifically, the valve main body 1 has in a side surface thereof an inflow hole 14 which allows the refrigerant to flow into, and has in a bottom surface thereof an outflow hole 15 which allows the refrigerant to flow out. A pair of valve body support members 4 and 5 facing each other at a fixed distance in a horizontal direction are disposed within the valve chamber 2 for supporting the valve body 3, and the valve body 3 is rotatably supported between a pair of valve body support members 4 and 5. Further, a valve seat port 14a forming an end opening in a valve chamber side of the inflow hole 14 is disposed in the valve body support member 4 in the inflow hole side. The valve body 3 slidably rotates horizontally while coming into contact with the valve seat port 14a, that is, around a center axis A1 extending in a vertical direction while being in contact with the valve seat port 14a (refer to reference symbol R3), and the flow rate of the passing refrigerant (the flow of the refrigerant is denoted by reference symbol F) is changed by the rotating state of the valve body 3 as mentioned later.

The rotation of the valve body 3 is performed by a drive unit (not shown) which is disposed in an upper surface portion of the valve main body 1, and a drive shaft (not shown) is connected to an upper shell wall of the valve body 3 from the above for transmitting a drive force of the drive unit to the valve body 3 (reference numeral 6 in FIG. 10 denotes a hole for allowing the shaft to fit into).

The valve body 3 is a hollow spherical body provided in an inner portion with a flow channel space 22 through which the refrigerant can flow, has in a side portion thereof an inflow port 23 which introduces a refrigerant flowing into through the inflow hole 14 into the flow channel space 22, and has in a bottom portion thereof an outflow port 24 which discharges the refrigerant from the flow channel space 22.

Here, the outflow port 24 in the bottom portion of the valve body always faces (directly faces) the outflow hole 15 in the bottom surface of the valve main body and is in a communication state. On the contrary, the inflow port 23 in the side portion of the valve body is changed its relative position with respect to the valve seat port 14a due to the rotation of the valve body 3. In other words, the inflow port 23 of the valve body 3 directly faces the valve seat port 14a in a fully open state of the valve and opens the inflow hole 14 (the flow channel 22 of the valve body 3 and the inflow hole 14 in the side surface of the valve main body come to a complete communication state).

On the contrary, in a fully close state of the valve in which the valve body 3 rotates horizontally at 90 degrees from the fully open state, the inflow port 23 of the valve body 3 is disconnected from the valve seat port 14a (the inflow port 23 and the valve seat port 14a do not overlap), and the valve seat port 14a is closed by a shell wall (an outer wall surface) of the valve body 3. Further, in a state between the fully open state and the fully close state, a flow channel area varies on the basis of an overlapping of the inflow port 23 and the valve seat port 14a, so that a flow rate at which the refrigerant passes through is determined.

Further, the following patent document 1 is provided as a document which discloses a valve switching a flow channel by rotating a rotor seal.

CITATION LIST

Patent Literature

Patent Literature 1: Japanese Unexamined Patent Publication No. 2011-169613

SUMMARY OF INVENTION

There is room for improvement in the light of an outer size of the valve and a manufacturing processability in the conventional ball valve.

In particular, in the conventional ball valve, it is necessary to support the valve body 3 so as to hold the valve body 3 from both side surfaces and form the valve seat port 14a in the side surface for transversely rotating the valve body 3. Therefore, a width (a size of the valve in a horizontal direction) of the valve main body 1 may be enlarged.

Further, in the conventional ball valve, the inner portion of the valve main body 1 (the valve chamber 2 in which the valve body 3 is installed) has a rectangular shape. However, it is not necessarily easy to cut the valve main body 1 constructed by a hard metal body, for example, a stainless steel or a brass so as to bore, and precisely form a rectangular valve chamber space for a short time. For example, the formation of the rectangular space is more difficult in comparison with a case where a cylindrical space is formed as the valve chamber 2, and a processing efficiency is remarkably lowered.

On the contrary, the problem as mentioned above is not generated by using a needle valve which changes a flow channel area for refrigerant by linearly moving forward and backward a conical valve body with respect to a valve seat port. However, the needle valve has a problem that an operation speed is generally lower than the ball valve and a valve leakage tends to be generated due to inclination of the valve body.

The problem as mentioned above can not be solved by the invention described in the patent literature 1 mentioned above.

Therefore, an object of the present invention is to obtain a structure of a new valve gear which has a high operating speed, has a less valve leakage amount, and can reduce a size in a horizontal direction. Further, a further object of the present invention is to improve a processability of the valve gear.

In order to solve the problem and achieve the object, a valve gear according to the present invention includes a first valve main body which has a valve chamber in an inner portion, a valve body which has a flow channel space in an inner portion and changes a flow rate for fluid by being rotated and driven within the valve chamber, a first flow channel hole which is formed in the valve main body and is communicated with the flow channel space to allow the fluid to pass through, a second flow channel hole which is formed in the valve main body and is changed a communicated state with the flow channel space on the basis of a rotational displacement position of the valve body to allow the fluid to pass through when being communicated with the flow channel space, and a transmission mechanism including a valve body drive shaft (hereinafter, also refer simply to as "drive shaft") which transmits a drive force for rotating the valve body to the valve body, wherein a rotation axis of the valve body and a rotation axis of the valve body drive shaft are orthogonal to each other.

In the valve gear according to the present invention, as is different from the conventional ball valve in which the valve body transversely rotates (the valve body rotates around the rotation axis of the shaft driving the valve body), the valve body is rotated in a vertical direction (around the axis line which is orthogonal to the rotation axis of the valve body drive shaft). Therefore, according to the present invention, it is not necessary to form both the first flow channel hole and the second flow channel hole in the side surface portion of the valve main body as in the conventional one, but the first flow channel hole can be formed in the side surface portion of the valve main body, and the second flow channel hole (the valve seat port changing the flow rate in cooperation with the valve body) can be arranged in the other than the side surface (for example, in a bottom surface of the valve main body). Thus, it is possible to reduce the size of the valve gear in the horizontal direction.

In particular, in recent years, there is needs for simultaneously cooling the other devices (for example, a battery) in addition to a vehicle air-conditioning. There is a case that a plurality of valve main bodies are arranged and connected in a transverse direction for supplying the refrigerant to a plurality of devices, and a plurality of valve bodies are lined up transversely and embedded in the valve main body. Therefore, if the width of the valve gear (the valve main body) can be reduced in this case, a plurality of valve gears (valve main bodies) can be installed in a narrow space, thereby easily responding to such the needs.

The valve gear according to the present invention is typically provided with one or more of the following aspects (1) to (9).

(1) The valve main body has the first flow channel hole in a side surface portion of the valve main body, and has the second flow channel hole at any peripheral position around the axis line of the first flow channel hole. The valve body has a first opening portion which communicates the first flow channel hole with the flow channel space, a second opening portion which communicates the second flow channel hole with the flow channel space when opening the valve, and a shell wall portion which closes the second flow channel hole when closing the valve. Further, the valve body is rotatably supported around the axis line of the first flow channel hole between a valve open state in which the second flow channel hole and the flow channel space are communicated via the second opening portion, and a valve close state in which the second flow channel hole is closed by the shell wall portion. Further, the transmission mechanism has a valve body driven shaft (hereinafter, also refer simply to as "driven shaft") and an engaging means. The valve body drive driven shaft extends in an axis line direction of the first flow channel hole, and rotates around the axis line of the first flow channel hole on the basis of application of a drive force transmitted from the valve body drive shaft to transmit the rotation to the valve body. The engaging means transmits the rotation of the valve body drive shaft to the valve body driven shaft. The rotation axis of the valve body drive shaft is orthogonal to the axis line of the first flow channel hole.

(2) The valve body has a spherical shape, the valve chamber has a circular transverse sectional shape, a valve seat port is disposed in an end edge portion of the second flow channel hole in the valve chamber side, and the valve body rotationally slides while being in contact with the valve seat port.

According to the aspect (2) as mentioned above, the valve body is hard to be inclined (a gap is hard to be generated with respect to the valve seat port even if the valve body is inclined) as is different from the needle valve. Therefore, it is possible to prevent or suppress the valve leakage when closing the valve. Here, the term "spherical" does not necessarily mean a completely spherical body, but may be provided partly with a flat surface or hole, a convex portion and a concave portion, for example.

Further, the valve chamber has the circular transverse sectional shape, that is, a shape such as a cylindrical inner space. Therefore, it becomes easy to process the valve chamber (process for forming the valve chamber by boring the valve main body, for example, with a cutting process). A transverse sectional area of the valve chamber is not necessarily fixed, but a step or a projection may be provided in an inner peripheral surface of the valve chamber.

(3) In the aspect (2) mentioned above, the first opening portion is formed so as to face the first flow channel hole, and is communicated with the flow channel space at any rotational position of the valve body to allow the fluid to pass through. On the other hand, the second opening portion communicates the second flow channel hole with the flow channel space by overlapping the valve seat port each other in the valve open state. The valve body is rotatably supported between a valve fully open state in which an overlapping degree between the second opening portion and the valve seat port becomes maximum, and a valve fully close state in which the second opening portion is detached from the valve seat port and the valve seat port is closed by the shell wall portion.

In the aspects (2) and (3) mentioned above, the valve body is rotationally slid while being in contact with the valve seat port. On the basis of this rotation, an overlapping portion of the second opening portion of the valve body and the valve seat port, that is, an opening area of the valve seat port (a flow channel area) is changed, and a flow rate of the fluid flowing through the first flow channel hole, the flow channel space of the valve body inner portion and the second flow channel hole is changed.

Describing in more detail, in a state in which the second opening portion directly faces (faces directly forward) the valve seat port, an opening area of the valve seat port becomes maximum, and the valve comes to the fully open state. When the valve body rotates from the fully open state, the opening area of the valve seat port becomes gradually smaller, the opening area of the valve seat port becomes zero when the overlapping between the second opening portion and the valve seat port is lost, and the valve comes to the valve close state. In this valve close state, the valve seat port is closed by the shell wall portion (an outer wall surface) of the valve body, the communicated state between the flow channel space of the valve body inner portion and the second flow channel hole is cancelled, and the fluid communication between the flow channel space (the first flow channel hole) of the valve body and the second flow channel hole is shut off.

In the valve gear according to the present invention (same in a ball valve according to a below mentioned embodiment), the fluid may be flowed into from the first flow channel hole and flowed out of the second flow channel hole, or conversely, the fluid may be flowed into from the second flow channel hole and flowed out of the first flow channel hole.

Further, in the valve gear according to the present invention and the aspects mentioned above, the valve seat port can be disposed in the bottom surface in place of the side surface of the valve main body. Therefore, it is possible to make the size of the valve in the width direction small. Further, it is generally necessary to rotate the valve body multiple times (plural times) for moving forward and backward the valve body with respect to the valve seat port in the needle valve. On the contrary, in the valve gear according to the present invention, it is sufficient to rotate the valve body only between the valve open (fully open) state in which the second opening portion of the valve body directly faces the valve seat port, and the valve close (fully close) state in which the second opening portion is detached from the valve seat port (overlapping is lost) (sufficient to rotate less than one time, for example, about 90 degree, that is, about one quarter). Therefore, a rapid opening and closing motion can be achieved.

(4) The valve body drive shaft extends along a center axis line extending in a vertical direction of the valve body. The valve body driven shaft extends along a center axis line extending in a horizontal direction of the valve body, and is fixed in a base end portion thereof to a side shell wall in an opposite side of the valve body to the first opening portion. The engaging means is disposed in a leading end portion of the valve body drive shaft and a leading end portion of the valve body driven shaft.

(5) The engaging means includes a driving side bevel gear which is disposed in the valve body drive shaft, and a driven side bevel gear which is disposed in the valve body driven shaft and engages with the driving side bevel gear.

(6) The number of teeth of the driven side bevel gear is set to be more than the number of teeth of the driving side bevel gear. This is because of securely driving the valve body even in a drive unit having a comparatively small rotation output.

(7) The valve body drive shaft extends downward in an inner portion of the valve main body from an upper portion of the valve main body and reaches the flow channel space through the upper shell wall of the valve body, the valve body is provided in the upper shell wall through which the valve body drive shaft passes, with an opening portion allowing the first flow channel hole to rotate around an axis line, and the opening portion has a first stopper portion which comes into contact with a side surface of the valve body drive shaft in the valve fully open state to stop the rotation of the valve body, and a second stopper portion which comes into contact with an opposite side surface of the valve body drive shaft in the valve fully close state to stop the rotation of the valve body.

According to the aspect (7) as mentioned above, it is possible to more securely stop the rotation of the valve body at each of the fully open position and the fully close position.

(8) The opening portion is a guide groove which extends like a circular arc along a shell wall of the valve body in parallel to a surface orthogonal to the axis line of the first flow channel hole, and allows the valve body to rotate around the axis line of the first flow channel hole, and controls the movement of the valve body in the axis line direction of the first flow channel hole by slidably coming into contact with the side surface of the valve body drive shaft, the first stopper portion is disposed in one end portion of the guide groove, and the second stopper portion is disposed in the other end portion of the guide groove.

According to the aspect (8) as mentioned above, not only the valve body is securely stopped at each of the fully open position and the fully close position, but also the valve body is prevented from being displaced to the axis line direction of the first flow channel hole during the rotation, so that it is possible to precisely rotate the valve body around the axis line of the first flow channel hole.

(9) The valve gear is a valve gear which can be installed to a housing member by screwing into a valve installation hole of the housing member, the housing member including the valve installation hole which can accept a valve gear, a first flow channel which is open to an inner peripheral surface of the valve installation hole and forms any one of an inflow channel and an outflow channel for fluid, and a second flow channel which is open to a bottom surface of the valve installation hole and forms the other of the inflow channel and the outflow channel for fluid, wherein the second flow channel hole is formed in a bottom surface portion of a valve main body, a female screw is disposed on an inner peripheral surface of the valve installation hole, the valve main body has a cylindrical shape and is provided on an outer peripheral surface with a male screw threadably engaging with the female screw, and when the valve gear is screwed into the valve installation hole from the bottom surface portion side provided with the second flow channel hole to be installed to the housing member while threadably engaging the male screw with the female screw, the first flow channel hole is communicated with the first flow channel of the housing member and the second flow channel hole is communicated with the second flow channel of the housing member.

According to the aspect (9) as mentioned above, for example, in a case where a manufacturer of the valve gear provides the valve gear to a manufacturer of the refrigeration cycle device corresponding to a customer for the valve gear manufacturer, the refrigeration cycle device can be completed by embedding the valve gear with a simple operation of only screwing the valve gear into the housing member, if the valve manufacturer and the customer previously share the specifications such as an outer size of the valve main body and positions of the first flow channel hole and the second flow channel hole and the customer side previously manufactures the housing member as a part of the refrigeration cycle device. Therefore, the customer can efficiently manufacture the refrigeration cycle device. Further, in a case where replacement of the valve gear is required when maintaining the refrigeration cycle device, it is possible to perform a replacing work by the similar simple operation.

According to the present invention, it is possible to provide the valve gear in which the operating speed is high, the valve leakage amount is small, and the width is small. Further, according to the typical aspect of the present invention, it is possible to improve the processability of the valve gear.

The other objects, features and advantages of the present invention are apparent from the following description of embodiments according to the present invention which is given on the basis of the accompanying drawings. In each of the drawings, same reference numerals denote the same or corresponding portions.

DESCRIPTION OF EMBODIMENTS

As shown in FIGS. 1 to 9, a valve gear 11 according to an embodiment of the present invention is a so-called cartridge type ball valve which is embedded in a refrigeration cycle device, for example, a heat pump type heating and cooling system, by being installed to a housing member 61 provided in the refrigeration cycle device, thereby regulating a flow rate of refrigerant.

Each of the drawings shows two-dimensional or three-dimensional coordinates which indicate a longitudinal direction, a lateral direction and a vertical direction and are orthogonal to each other, and a description will be given below on the basis of these directions. Further, each of the drawings (in particular, after FIG. 2) mainly illustrates a valve body, a valve seat, a valve main body and a lower portion of a transmission mechanism which correspond to specific structures for the present invention, and an illustration of a portion above the valve main body, that is, a drive unit, a second bearing member, an upper portion of a first bearing ember and an upper portion of a valve body drive shaft is appropriately omitted.

The housing member 61 is provided with a valve installation hole 62 which can install the ball valve 11, a first flow channel 63 which is open to an inner peripheral surface of the valve installation hole 62 and forms an inflow channel for refrigerant, and a second flow channel 64 which is open to a bottom surface of the valve installation hole 62 and forms an outflow channel for refrigerant, and a female screw 65 for fixing the ball valve 11 within the valve installation hole 62 is formed on the inner peripheral surface of the valve installation hole 62.

On the other hand, the ball valve 11 installed to the housing member 61 has a cylindrical valve main body 12 which is provided with a valve chamber 13 in an inner portion and is open in an upper surface, a cylindrical first bearing member 37 which is fitted and inserted into the upper surface opening of the valve main body 12, a cylindrical second bearing member 38 which is fitted and inserted into an upper surface opening of the first bearing member 37, a can 35 which covers an upper surface portion of the valve main body 12 including the first bearing member 37 and the second bearing member 38 and forms a sealed space together with the valve main body 12, a spherical valve body 21 which controls a passing flow rate of the refrigerant by rotatably supported within the valve chamber 13, a drive unit which is disposed in the upper surface portion of the valve main body 12 for driving the valve body 21, and a transmission mechanism which transmits a drive force of the drive unit to the valve body 21.

The can 35 is a cylindrical member which is covered and not bottomed (is open in a bottom surface and is closed in a top surface), is installed so as to be covered to the upper portion of the first bearing member 37, and is bonded to the first bearing member 37 via a ring-shaped base plate 36. Further, a male screw 19 threadably engaged with the female screw 65 of the housing member 61 is formed on an upper outer peripheral surface of the valve main body 12.

Further, the valve main body 12 has an inflow hole (a first flow channel hole) 14 flowing the refrigerant into the valve chamber 13 in a side surface portion (a right side portion in the present embodiment), and has an outflow hole (a second flow channel hole) 15 flowing the refrigerant out in a bottom surface portion (a lower surface portion). An upper surface (an upper edge) of the outflow hole 15 is provided with a ring-shaped valve seat (a valve seat port) 16 with which the valve body 21 comes into contact so as to rotationally slide. The valve body 21 is held by the valve seat 16, and a valve body support portion 17 which is formed on an inner wall surface of the valve chamber at a fixed distance above the valve seat 16 to face the valve seat 16, so as to be rotationally slidable, that is, be rotatable around an axis line A2 of the inflow hole 14 (and an axis line of an inflow port 23 mentioned later).

Further, when the ball valve 11 is installed to the housing member 61, the inflow hole 14 of the valve main body 12 is communicated with the first flow channel 63 of the housing member 61, and the outflow hole 15 of the valve main body 12 is communicated with the second flow channel 64 of the housing member 61 so as to be openable and closable by the valve body 21. The installation of the ball valve 11 to the housing member 61 is achieved by screwing the valve main body 12 into the valve installation hole 62 of the housing member 61 until a flange portion 18 in an upper portion of the valve main body comes into contact with the upper surface of the housing member 61 (fitting the valve main body 12 to the valve installation hole 62 while threadably engaging the male screw 19 on the peripheral surface of the valve main body with the female screw 65 of the housing member 61).

The valve body 21 is a hollow spherical body which forms a hollow cavity (a flow channel space 22) in an inner portion, is provided in a right side portion with an inflow port 23 which allows the refrigerant to flow into the flow channel space 22, and is provided in a lower portion (a bottom portion) with an outflow port 24 which allows the refrigerant to flow out of the flow channel space 22. The valve body 21 is rotationally driven for regulating a refrigerant flow rate, the inflow port 23 of the valve body 21 is arranged in such a manner as to directly face the inflow hole 14 of the valve main body 12, and the inflow hole 14 and the inflow port 23 (the flow channel space 22 of the valve body inner portion) are always in a communicated state regardless of a rotating state (a rotational displacement position) of the valve body 21.

On the contrary, the outflow port 24 of the valve body 21 changes a relative position to the outflow hole 15 (the valve seat 16) of the valve main body 12 by the rotation of the valve body 21, and directly faces the valve seat 16 (the outflow hole 15) in a valve fully open state in which overlapping with the valve seat 16 becomes maximum, so that the outflow port 24 (the flow channel space 22) of the valve body 21 and the outflow hole 15 of the valve main body 12 are in a communicated state. On the other hand, when rotating approximately at 90 degrees (rotating at one quarter) from the fully open state, the overlapping with the valve seat 16 is lost, the valve seat 16 (the outflow hole 15) is closed by a shell wall 21*a* of the valve body 21 (an outer wall surface of the valve body), and the valve comes to a fully close state.

Further, in an intermediate state of the fully open state and the fully close state, the larger the overlapping between the outflow port 24 of the valve body 21 and the valve seat 16 is, the larger a cross section of the flow channel is, and the more the passing flow rate of the refrigerant is. The smaller the overlapping is, the smaller the cross section of the flow channel is, and the less the passing flow rate of the refrigerant is. Thus, the passing flow rate of the refrigerant is regulated. The motion and the function of the valve body 21 as mentioned above can be achieved by a circular shape around the horizontal axis line A2. Therefore, the valve body 21 is not limited to the spherical body, but may be formed into "spherical shapes", and the "spherical shapes" include such shapes as a prolate spheroid (a spheroid) and a cylindrical shape.

The transmission mechanism transmitting the drive force to the valve body 21 has a valve body drive shaft 31 which is connected an upper end portion thereof to an output shaft 39 of a drive unit mentioned later and vertically downward extends to an upper portion of the flow channel space 22 of the valve body inner portion while passing through the first bearing member 37 and the upper shell wall of the valve body 21 through a center portion of the second bearing member 38, and a valve body driven shaft 33 which horizontally extends in a lateral direction (a direction of the axis line A2 of the inflow hole 14) within the flow channel space 22 of the valve body 21, and rotates around the axis line A2 of the inflow hole 14 by the application of a rotational drive force (a rotating force around the center axis A1 in the vertical direction) R1 transmitted from the drive unit via the valve body drive shaft 31.

Further, in order to convert the rotation around the vertical axis A1 by the drive shaft 31 into the rotation around the horizontal axis A2 and transmit to the driven shaft 33, a lower end of the drive shaft 31 is provided with a bevel gear (a driving side bevel gear) 32, and a leading end (a right end) of the driven shaft 33 is provided with a bevel gear (a driven side bevel gear) 34 which engages with the driving side bevel gear 32. In the numbers of teeth of these bevel gears 32 and 34, the number of teeth of the driven side bevel gear 34 is made larger than the number of teeth of the driving side bevel gear 32. This is because of allowing the drive unit having a comparatively small output to securely rotate and drive the valve body 21. In each of the drawings, the teeth of each of the gears 32 and 34 are not shown.

In the driven shaft 33, a base end portion (a left end portion) 33*a* thereof is fixed to a shell wall (a left wall surface) of the valve body 21. More specifically, a through hole passing through the shell wall (the left wall surface) of the valve body 21 is bored, and the base end portion 33*a* is fitted into the through hole from the inner portion (the flow channel space 22) side of the valve body 21, thereby firmly attaching the driven shaft 33 to the valve body 21. In order to allow a rotation axis portion 33*b* mentioned next to be inserted into the through hole from an outer side of the valve body 21, the base end portion 33*a* of the drive shaft 33 is made shorter than the through hole. Therefore, the valve body 21 rotates together with the driven shaft 33.

Further, the valve body 21 is rotatably supported to the valve main body 12 by the rotation axis portion 33*b*. More specifically, in the rotation axis portion 33*b*, one end side (a left end portion) is fixed to the valve chamber 13 (a left wall surface of the valve main body 12), and the other end side is inserted into the through hole bored in the shell wall of the valve body 21 from an outer portion side (the valve chamber 13 side) of the valve body 21, so that the rotation axis portion 33*b* rotatably support the valve body 21. Therefore, the valve body 21 slidably rotates around the rotation axis portion 33*b* on the basis of the application of the rotational drive force from the drive shaft 31.

The rotation axis portion 33*b* is constructed as a different member (one independent member) in the present embodiment, however, may be formed integrally with the other member (as a part of the other member). For example, the rotation portion 33*b* may be formed by protruding out the wall surface of the valve main body 12 as a part of the valve main body 12. Further, for example, the base end portion 33*a* of the driven shaft 33 may be extended so as to extend to an outer side of the valve body 21 through the through hole, and the extended base end portion 33*a* may be rotatably fitted to a concave portion (for example, a hole) formed on an inner wall of the valve chamber 13.

Further, in order to allow the valve body 21 through which the drive shaft 31 passes to rotate, and prevent the valve body 21 from being transversely displaced (being position displaced in a direction orthogonal to a direction of rotation), a guide groove 25 corresponding to a slit-shaped opening is formed in the valve body 21. The guide groove 25 extends like a circular arc in a longitudinal direction along the shell wall of the valve body 21. Therefore, the valve body 21 can rotate around the axis line A2 of the inflow hole 14 in spite that the drive shaft 31 is passed through.

Further, both end portions of the guide groove 25, that is, a front end portion 25*a* and a rear end portion 25*b* form a stopper portion which stops the rotation of the valve body 21. More specifically, the front end portion 25*a* of the guide groove 25 comes into contact with the side surface of the drive shaft 31 when the valve opens (fully opens), and the rear end portion 25*b* of the guide groove 25 comes into contact with the opposite side surface of the drive shaft 31 when the valve closes, thereby respectively stopping the rotation of the valve body 21 securely.

Further, a width of the guide groove 25 is approximately equal to an outer diameter of the drive shaft 31, and a pair of opposite inner wall surfaces forming the guide groove 25 are in contact with both side surfaces (a left side surface and a right side surface) of the drive shaft 31 while allowing the valve body 21 to rotationally slide. More specifically, the valve body 21 rotates along the guide groove 25 which holds the drive shaft 31 from both right and left sides. Therefore, it is possible to prevent the valve body 21 from transversely displacing and inclining when rotating, and it is possible to achieve a secure valve opening and closing motion on the basis of a stable rotation of the valve body 21.

In the present embodiment, the drive unit is constructed by a stepping motor 41 including a mold assembly 42 which forms a stator disposed in an outer periphery (an outer side) of the can 35 and a rotor 47 which is rotatably installed in an inner periphery (an inner side) of the can 35, and a speed reduction mechanism (a paradox planetary gear speed reduction mechanism) 56 which decelerates the rotation of the stepping motor 41.

The stator (the mold assembly) 42 includes a yoke 43, a bobbin 44, a coil 45 and a resin mold cover 46. Further, the rotor 47 is constructed by integrally connecting a cylindrical rotor member 47a which is manufactured by a magnetic material, and a sun gear member 48 which is manufactured by a resin material. A shaft 49 is inserted into a center portion of the sun gear member 48, and an upper portion of the shaft 49 is supported by a support member 50 which is arranged in a top inner side of the can 35.

A sun gear 48a of the sun gear member 48 engages with a plurality of planetary gears 51 which are rotatably supported to a shaft 52 disposed in a carrier 54 mounted on a bottom surface of an output gear 55. An upper portion of the planetary gear 51 engages with an annular ring gear (internal fixed gear) 57 which is attached to an upper portion of the cylindrical member 40 fixed to the upper portion of the valve main body 12, and a lower portion of the planetary gear 51 engages with an internal tooth gear 53 of an annular output gear 55. The number of teeth of the ring gear 57 is slightly different from the number of teeth of the internal tooth gear 53. Thus, the number of rotation of the sun gear 48a is decelerated with a great deceleration ratio and is transmitted to the output gear 55. The gear mechanisms (the sun gear 48a, the planetary gear 51, the ring gear 57 and the output gear 55) construct the speed reduction mechanism (the paradox planetary gear speed reduction mechanism) 56 which decelerates the rotation of the stepping motor 41 mentioned above.

The output gear 55 is in rotationally slidably contact with the upper surface of the second bearing member 38. Further, an upper portion of a stepped cylindrical output shaft 31 is pressed into the center of a bottom portion of the output gear 55 to be connected, and a lower portion of the output shaft 39 is rotatably inserted into an insertion hole 38a which is formed in an upper surface portion of the center portion of the second bearing member 38. Further, a lower end portion of the shaft 49 is fitted to the upper portion of the output shaft 39 so as to be relatively rotatable.

Further, a slit-shaped fitting groove 39a is formed in a lower end portion of the output shaft 39 which is connected to the output gear 55, and a plate-like portion 31a is formed in the upper end portion of the valve body drive shaft 31, the plate-like portion 31a being fitted to the fitting groove 39a and formed into a flat tip screwdriver. Further, the drive shaft 31 and the output shaft 39 are connected by fitting the plate-like portion 31a to the fitting groove 39a, and it is possible to transmit the rotating motion of the output gear 55 to the drive shaft 31 via the output shaft 39.

In the ball valve 11 according to the present embodiment structured as mentioned above, the rotational drive force generated by the stepping motor 41 is transmitted to the valve body 21 via the speed reduction mechanism 56 and the transmission mechanism (the drive shaft 31 and the driven shaft 33), and the refrigerant flow rate can be regulated by changing the rotational displacement amount the rotational displacement position) of the valve body as already mentioned. Further, according to the ball valve 11 of the present embodiment, the ball valve 11 can be embedded in the refrigeration cycle device only by a simple operation of screwing the ball valve 11 to the valve installation hole 62 of the housing member 61 when assembling the refrigeration cycle device or when replacing the ball valve 11. Therefore, it is possible to construct the refrigeration cycle device or perform a maintenance work with a good operability.

Further, in the ball valve 11 according to the present embodiment, the valve seat 16 and the valve body support portion 17 holding the valve body 21 therebetween are arranged up and down, and it is accordingly possible to make an outer size of the valve in a horizontal direction small. Further, the valve body 21 is formed into a spherical shape and a position displacement thereof in a lateral direction is controlled by the guide groove 25. A lateral slip and an inclination of the valve body 21 are hard to be generated, and it is possible to reduce the valve leakage amount.

Further, the rotation of the valve body 21 can be securely stopped by brining into contact with both end portions (the front end portion 25a and the rear end portion 25b) of the guide groove 25, and it is accordingly possible to maintain the fully open state and the fully close state. Further, it is sufficient to rotate the valve body 21 at one quarter between the fully open state and the fully close state, and it is accordingly possible to rapidly open and close and regulate the flow rate. Further, the stepping motor 41 is used as the drive unit. Therefore, it is possible to accurately determine an angle of rotation of the valve body 21 and it is possible to precisely control the flow rate.

The description is given above of the embodiments according to the present invention. However, it is apparent for a person skilled in the art that the present invention is not limited to them, and can be variously changed within the scope of claims.

For example, the bevel gears 32 and 34 are employed as the engaging means for transmitting the rotation of the valve body drive shaft 31 to the valve body driven shaft 33. However, the other engaging means, for example, a worm gear may be employed. Further, in a case where the valve body support portion 17, the valve seat 16 or the valve body 21 is structured such as to suppress the rotation around the vertical axis A1 of the valve body 21, the valve body 21 can be rotated around the axis of the driven shaft 33 even in a structure which is not provided with the rotation axis portion 33b. As the structure mentioned above, for example, there can be considered a structure in which the shapes of the valve seat and the valve body support portion are changed, and a cylindrical valve body (a cylindrical valve body in which a center axis is approximately in parallel to the horizontal axis A2) is arranged as the ball valve.

Further, the ball valve according to the present invention can be preferably used for the refrigeration cycle device having the refrigerant circuit typically such as an air conditioner or a freezer and refrigerator. However, the use is not limited to them, but the ball valves according to the present invention and the aspects can be additionally used for various uses. Therefore, the "fluid" in the present invention and each of the aspects includes various liquids and gases in addition to the heat medium (cooling medium and heating medium).

The invention claimed is:

1. A valve gear comprising:
   a valve main body having a valve chamber in an inner portion;
   a valve body having a flow channel space in an inner portion and changing a flow rate of fluid by being rotated and driven within the valve chamber;
   a first flow channel hole formed in the valve main body and communicated with the flow channel space to allow the fluid to pass through;
   a second flow channel hole formed in the valve main body, changing a communicated state with the flow channel space on the basis of a rotational displacement position of the valve body, and allowing the fluid to pass through when being communicated with the flow channel space; and
   a transmission mechanism including a valve body drive shaft to transmit a drive force for rotating the valve body to the valve body,
   wherein a rotation axis of the valve body and a rotation axis of the valve body drive shaft are orthogonal to each other,
   wherein the valve main body has the first flow channel hole in a side surface portion of the valve main body, and has the second flow channel hole at any peripheral position around an axis line of the first flow channel hole,
   wherein the valve body has a first opening portion which communicates the first flow channel hole with the flow channel space, a second opening portion which communicates the second flow channel hole with the flow channel space when opening the valve, and a shell wall portion which closes the second flow channel hole when closing the valve,
   wherein the valve body is rotatably supported around the axis line of the first flow channel hole between a valve open state in which the second flow channel hole and the flow channel space are communicated via the second opening portion, and a valve close state in which the second flow channel hole is closed by the shell wall portion,
   wherein the transmission mechanism further comprises:
   a valve body driven shaft which extends in an axis line direction of the first flow channel hole, and rotates around the axis line of the first flow channel hole on the basis of application of a drive force transmitted from the valve body drive shaft to transmit the rotation to the valve body: and
   an engaging means which transmits the rotation of the valve body drive shaft to the valve body driven shaft, and
   wherein the rotation axis of the valve body drive shaft is orthogonal to the axis line of the first flow channel hole.

2. The valve gear according to claim 1, wherein the valve body has a spherical shape,
   wherein the valve chamber has a circular transverse sectional shape,
   wherein the second flow channel hole has a valve seat port in an end edge portion in the valve chamber side, and
   wherein the valve body rotationally slides while being in contact with the valve seat port.

3. The valve gear according to claim 2, wherein the first opening portion is formed so as to face the first flow channel hole, and is communicated with the flow channel space at any rotational position of the valve body to allow the fluid to pass through,
   wherein the second opening portion communicates the second flow channel hole with the flow channel space by overlapping the valve seat port each other in the valve open state,
   wherein the valve body is rotatably supported between a valve fully open state in which an overlapping degree between the second opening portion and the valve seat port becomes maximum, and a valve fully close state in which the second opening portion is detached from the valve seat port and the valve seat port is closed by the shell wall portion.

4. The valve gear according to claim 1, wherein the valve body drive shaft extends along a center axis line extending in a vertical direction of the valve body,
   wherein the valve body driven shaft extends along a center axis line extending in a horizontal direction of the valve body, and is fixed in a base end portion thereof to a side shell wall in an opposite side of the valve body to the first opening portion, and
   wherein the engaging means is disposed in a leading end portion of the valve body drive shaft and a leading end portion of the valve body driven shaft.

5. The valve gear according to claim 4, wherein the engaging means comprises:
   a driving side bevel gear which is disposed in the valve body drive shaft; and
   a driven side bevel gear which is disposed in the valve body driven shaft and engages with the driving side bevel gear.

6. The valve gear according to claim 5, wherein the number of teeth of the driven side bevel gear is more than the number of teeth of the driving side bevel gear.

7. A valve gear comprising:
   a valve main body having a valve chamber in an inner portion;
   a valve body having a flow channel space in an inner portion and changing a flow rate of fluid by being rotated and driven within the valve chamber;
   a first flow channel hole formed in the valve main body and communicated with the flow channel space to allow the fluid to pass through;
   a second flow channel hole formed in the valve main body, changing a communicated state with the flow channel space on the basis of a rotational displacement position of the valve body, and allowing the fluid to pass through when being communicated with the flow channel space; and
   a transmission mechanism including a valve body drive shaft to transmit a drive force for rotating the valve body to the valve body,
   wherein a rotation axis of the valve body and a rotation axis of the valve body drive shaft are orthogonal to each other,
   wherein the valve body drive shaft extends downward in an inner portion of the valve main body from an upper portion of the valve main body and reaches the flow channel space through the upper shell wall of the valve body,
   wherein the valve body comprises an opening portion which allows the first flow channel hole to rotate around an axis line, in the upper shell wall through which the valve body drive shaft passes, and
   wherein the opening portion comprises:

a first stopper portion which comes into contact with a side surface of the valve body drive shaft in the valve fully open state to stop the rotation of the valve body; and a second stopper portion which comes into contact with an opposite side surface of the valve body drive shaft in the valve fully close state to stop the rotation of the valve body.

8. The valve gear according to claim 7, wherein the opening portion is a guide groove which extends like a circular arc along the shell wall of the valve body in parallel to a surface orthogonal to the axis line of the first flow channel hole, and allows the valve body to rotate around the axis line of the first flow channel hole, and controls the movement of the valve body in the axis line direction of the first flow channel hole by slidably coming into contact with the side surface of the valve body drive shaft, wherein the first stopper portion is disposed in one end portion of the guide groove, and wherein the second stopper portion is disposed in the other end portion of the guide groove.

9. A valve gear comprising:

a valve main body having a valve chamber in an inner portion;

a valve body having a flow channel space in an inner portion and changing a flow rate of fluid by being rotated and driven within the valve chamber;

a first flow channel hole formed in the valve main body and communicated with the flow channel space to allow the fluid to pass through;

a second flow channel hole formed in the valve main body, changing a communicated state with the flow channel space on the basis of a rotational displacement position of the valve body, and allowing the fluid to pass through when being communicated with the flow channel space; and a transmission mechanism including a valve body drive shaft to transmit a drive force for rotating the valve body to the valve body, wherein a rotation axis of the valve body and a rotation axis of the valve body drive shaft are orthogonal to each other, wherein the valve gear is a valve gear which can be installed to a housing member by screwing into a valve installation hole of the housing member, the housing member comprising a valve installation hole which is capable of accepting a valve gear, a first flow channel which is open to an inner peripheral surface of the valve installation hole and forms any one of an inflow channel and an outflow channel for fluid, and a second flow channel which is open to a bottom surface of the valve installation hole and forms the other of the inflow channel and the outflow channel for fluid, wherein the second flow channel hole is formed in a bottom surface portion of the valve main body, wherein a female screw is disposed on an inner peripheral surface of the valve installation hole, wherein the valve main body has a cylindrical shape and is provided on an outer peripheral surface with a male screw threadably engaging with the female screw, and wherein when the valve gear is screwed into the valve installation hole from the bottom surface portion side provided with the second flow channel hole to be installed to the housing member while threadably engaging the male screw with the female screw, the first flow channel hole is communicated with the first flow channel of the housing member and the second flow channel hole is communicated with the second flow channel of the housing member.

* * * * *